(12) United States Patent
Taylor et al.

(10) Patent No.: US 10,389,666 B2
(45) Date of Patent: Aug. 20, 2019

(54) EVENT NOTIFICATION

(71) Applicant: eBuddy Holding B.V., Amsterdam (NL)

(72) Inventors: Paulo Taylor, Amsterdam (NL); Jan-Joost C. Rueb, Amsterdam (NL); Onno Bakker, Haarlem (NL)

(73) Assignee: EBUDDY TECHNOLOGIES B.V., Amsterdam (NL)

( * ) Notice: Subject to any disclaimer, the term of this patent is extended or adjusted under 35 U.S.C. 154(b) by 0 days.

(21) Appl. No.: 14/458,028

(22) Filed: Aug. 12, 2014

(65) Prior Publication Data
US 2015/0081786 A1 Mar. 19, 2015

Related U.S. Application Data

(60) Continuation of application No. 13/847,423, filed on Mar. 19, 2013, now Pat. No. 8,806,084, which is a
(Continued)

(51) Int. Cl.
G06F 3/06 (2006.01)
H04L 12/58 (2006.01)
(Continued)

(52) U.S. Cl.
CPC ............. *H04L 51/16* (2013.01); *G06F 9/542* (2013.01); *G06F 16/958* (2019.01); *G06Q 10/10* (2013.01); *G06Q 10/107* (2013.01); *H04L 51/00* (2013.01); *H04L 51/04* (2013.01); *H04L 51/043* (2013.01); *H04L 65/403* (2013.01); *H04L 67/02* (2013.01); *H04L 67/1044* (2013.01); *H04L 67/2814* (2013.01); *H04L 67/2823* (2013.01);
(Continued)

(58) Field of Classification Search
CPC ... G06F 3/00; G06F 5/00; G06F 12/00; G06F 13/00
See application file for complete search history.

(56) References Cited

U.S. PATENT DOCUMENTS 4,531,184 A 7/1985 Wigan et al.
6,415,313 B1 7/2002 Yamada et al.
(Continued)

FOREIGN PATENT DOCUMENTS

EP 0854655 7/1998
EP 1292071 9/2002
(Continued)

OTHER PUBLICATIONS

International Application No. PCT/IB2006/04193, International Search Report and Written Opinion mailed Jun. 24, 2008.
(Continued)

*Primary Examiner* — Scott C Sun
(74) *Attorney, Agent, or Firm* — Ahmann Kloke LLP

(57) ABSTRACT

A technique for user notification involves receiving an event notification related to an event associated with user notification by a user; providing the event notification from a stored array to a process executed by a processor; using the event notification as a first title used for the process; providing a second title from the stored array to the process; and using the second title to identify the process to the user.

41 Claims, 11 Drawing Sheets

Related U.S. Application Data continuation of application No. 13/165,709, filed on Jun. 21, 2011, now Pat. No. 8,230,135, which is a division of application No. 11/637,514, filed on Dec. 11, 2006, now Pat. No. 8,037,212.

(60) Provisional application No. 60/748,988, filed on Dec. 9, 2005.

(51) Int. Cl.

| | | |
|---|---|---|
| H04M 3/493 | (2006.01) | |
| G06F 16/958 | (2019.01) | |
| G06Q 10/10 | (2012.01) | |
| H04L 29/08 | (2006.01) | |
| H04L 29/06 | (2006.01) | |
| G06F 9/54 | (2006.01) | |
| G06F 13/38 | (2006.01) | |
| H04M 1/725 | (2006.01) | |

(52) U.S. Cl.
CPC .......... *H04L 67/306* (2013.01); *H04M 3/493* (2013.01); *H04L 51/066* (2013.01); *H04L 51/22* (2013.01); *H04L 65/00* (2013.01); *H04M 1/72547* (2013.01)

(56) References Cited

U.S. PATENT DOCUMENTS

| | | |
|---|---|---|
| 6,415,318 B1 | 7/2002 | Aggarwal et al. |
| 6,484,196 B1 | 11/2002 | Maurille |
| 6,571,234 B1 | 5/2003 | Knight et al. |
| 6,993,327 B2 | 1/2006 | Mathis |
| 7,042,879 B2 | 5/2006 | Eschbach et al. |
| 7,389,324 B2 | 6/2008 | Masonis et al. |
| 7,426,382 B2 | 9/2008 | Aerrabotu et al. |
| 7,496,379 B2 | 2/2009 | Kaplan et al. |
| 7,512,619 B2 | 3/2009 | Burkhardt |
| 7,523,138 B2 | 4/2009 | Gruhl et al. |
| 7,587,501 B2 | 9/2009 | Stillion et al. |
| 7,636,755 B2 | 12/2009 | Blattner et al. |
| 7,730,144 B2 | 6/2010 | Taylor et al. |
| 7,779,076 B2 | 8/2010 | Heikes et al. |
| 7,933,957 B2 | 4/2011 | Daniell |
| 8,037,212 B2 | 10/2011 | Taylor et al. |
| 8,135,774 B2 | 3/2012 | Ryabchun et al. |
| 8,458,347 B2 | 6/2013 | Polis et al. |
| 2001/0026231 A1* | 10/2001 | Satoh ........................ 341/87 |
| 2002/0063735 A1 | 5/2002 | Tamir et al. |
| 2002/0077080 A1 | 6/2002 | Greene |
| 2002/0091770 A1 | 7/2002 | Takakura et al. |
| 2002/0143916 A1 | 10/2002 | Mendiola et al. |
| 2002/0154153 A1 | 10/2002 | Messinger et al. |
| 2003/0028597 A1 | 2/2003 | Saimi et al. |
| 2003/0061382 A1 | 3/2003 | Brown et al. |
| 2003/0076367 A1 | 4/2003 | Bencze et al. |
| 2003/0088676 A1 | 5/2003 | Smith et al. |
| 2003/0131061 A1 | 7/2003 | Newton et al. |
| 2003/0210265 A1 | 11/2003 | Haimberg |
| 2003/0222907 A1 | 12/2003 | Heikes et al. |
| 2003/0225846 A1 | 12/2003 | Heikes et al. |
| 2004/0010808 A1 | 1/2004 | DeCarmo |
| 2004/0015547 A1* | 1/2004 | Griffin et al. ............ 709/204 |
| 2004/0054646 A1 | 3/2004 | Daniell et al. |
| 2004/0054802 A1 | 3/2004 | Beauchamp et al. |
| 2004/0083297 A1 | 4/2004 | Gazzetta et al. |
| 2004/0158609 A1 | 8/2004 | Daniell et al. |
| 2004/0158610 A1 | 8/2004 | Davis et al. |
| 2004/0185874 A1 | 9/2004 | Kim et al. |
| 2004/0221224 A1 | 11/2004 | Blattner et al. |
| 2004/0243941 A1 | 12/2004 | Fish |
| 2005/0038868 A1* | 2/2005 | Spicer .................. G06F 17/212 709/217 |
| 2005/0038876 A1 | 2/2005 | Chaudhuri |
| 2005/0080867 A1 | 4/2005 | Malik et al. |
| 2005/0097061 A1 | 5/2005 | Shapiro et al. |
| 2005/0108341 A1 | 5/2005 | Mathew et al. |
| 2005/0114454 A1 | 5/2005 | D'Angelo et al. |
| 2005/0119910 A1* | 6/2005 | Schneider .......... G06Q 30/0601 709/203 |
| 2005/0187781 A1 | 8/2005 | Christensen |
| 2005/0216300 A1 | 9/2005 | Appelman et al. |
| 2005/0259656 A1 | 11/2005 | Dollar et al. |
| 2005/0268237 A1 | 12/2005 | Crane et al. |
| 2006/0080392 A1 | 4/2006 | Kawakami et al. |
| 2006/0095562 A1 | 5/2006 | Agarwal et al. |
| 2006/0168054 A1* | 7/2006 | Burkhart ................. H04L 51/04 709/206 |
| 2006/0248157 A1 | 11/2006 | Daniell et al. |
| 2006/0256816 A1 | 11/2006 | Yarlagadda et al. |
| 2006/0265381 A1 | 11/2006 | Altaf et al. |
| 2006/0268828 A1 | 11/2006 | Yarlagadda |
| 2006/0271630 A1 | 11/2006 | Bensky et al. |
| 2006/0277053 A1 | 12/2006 | Lobb et al. |
| 2007/0043878 A1 | 2/2007 | Carlson et al. |
| 2007/0135099 A1 | 6/2007 | Taylor et al. |
| 2007/0136419 A1 | 6/2007 | Taylor et al. |
| 2007/0168451 A1 | 7/2007 | Taylor et al. |
| 2007/0168529 A1 | 7/2007 | Taylor et al. |
| 2007/0168558 A1 | 7/2007 | Taylor et al. |
| 2007/0192479 A1 | 8/2007 | Felten |
| 2007/0300164 A1 | 12/2007 | Bhogal et al. |
| 2008/0182559 A1 | 7/2008 | Pyhalammi et al. |
| 2009/0125591 A1 | 5/2009 | Kirkpatrick |
| 2009/0187536 A1 | 7/2009 | Jackson |
| 2010/0099421 A1 | 4/2010 | Patel et al. |
| 2010/0228747 A1 | 9/2010 | Taylor et al. |
| 2010/0325222 A1 | 12/2010 | Taylor et al. |

FOREIGN PATENT DOCUMENTS

| | | |
|---|---|---|
| WO | 9948011 | 9/1999 |
| WO | 0120474 | 3/2001 |
| WO | 0143357 | 6/2001 |
| WO | 03056764 | 7/2003 |
| WO | 2004027562 A2 | 9/2003 |
| WO | 2004031976 | 4/2004 |
| WO | 2004079530 | 9/2004 |
| WO | 2005045591 | 5/2005 |
| WO | 2005074588 | 8/2005 |
| WO | 2006083820 | 8/2006 |
| WO | 2007063041 | 6/2007 |
| WO | 2007110703 | 10/2007 |
| WO | 2007129143 | 11/2007 |
| WO | 2007129144 | 11/2007 |
| WO | 2008072028 | 6/2008 |
| WO | 2008072030 | 6/2008 |

OTHER PUBLICATIONS

International Application No. PCT/IB2006/04200, International Search Report and Written Opinion mailed Oct. 23, 2007.
International Application No. PCT/IB2006/04204, International Search Report and Written Opinion mailed Jan. 8, 2008.
International Application No. PCT/IB2006/04205, Corrected International Search Report and Written Opinion mailed Apr. 4, 2008.
International Application No. PCT/IB2006/04264, International Search Report and Written Opinion mailed Jun. 30, 2008.
International Application No. PCT/US2012/000046, International Search Report and Written Opinion mailed Apr. 2, 2012.
Experts Exchange, LLC, "How to make blinking minimized form in title bar vb.net," Jul. 7, 2004 [retrieved online at https://www.experts-exchange.com/questions/20946835/how-to-make-blinking-minimized-form-in-title-bar-vb-net.html#answer10778413 on Jan. 9, 2017].
MozillaZine, "URL displayed in the title bar when we used open window," Apr. 29, 2005 [retrieved online at http://forums.mozillazine.org/viewtopic.php?f=38&t=258175&start=0&st=0&sk=t&sd=a on Jan. 9, 2017].
PC Magazine, "Instant-messaging aggregators," May 4, 2005 [retrieved online at http://www.pcmag.com/article2/0,2817,1791523,00.asp on Jan. 9, 2017].

(56) References Cited

OTHER PUBLICATIONS

PC Review, "Change titlebar text in VB code," Jan. 19, 2004 [retrieved online at https://www.pereview.co.uk/threads/change-titlebar-text-in-vb-code.1080539/ on Jan. 9, 2017].

PC Review, "Yahoo Messenger and the flashing taskbar message," Jan. 15, 2004 [retrieved online at https://www.pereview.co.uk/threads/yahoo-messenger-and-the-flashing-taskbar-message.1504897/ on Jan. 9, 2017].

\* cited by examiner

EVENT NOTIFICATION

CROSS-REFERENCE TO RELATED APPLICATIONS

This application is a continuation of U.S. Ser. No. 14/491,895, filed Sep. 19, 2014, entitled EVENT NOTIFICATION SYSTEM AND METHOD, which is a reissue application of U.S. Ser. No. 13/847,423, filed Mar. 19, 2013, entitled EVENT NOTIFICATION SYSTEM AND METHOD, now U.S. Pat. No. 8,806,084, which is a continuation of U.S. Ser. No. 13/165,709, filed Jun. 21, 2011, entitled EVENT NOTIFICATION SYSTEM AND METHOD, now U.S. Pat. No. 8,230,135, which is a divisional of U.S. Ser. No. 11/637,514, filed Dec. 11, 2006, entitled EVENT NOTIFICATION SYSTEM AND METHOD, now U.S. Pat. No. 8,037,212, which claims priority to U.S. Provisional Patent Application Serial No. 60/748,988, filed Dec. 9, 2005, entitled WEB INSTANT MESSENGER, which are incorporated herein by reference.

BACKGROUND

Instant messaging requires the use of a client program that hooks up an instant messaging service and differs from e-mail in that conversations are then able to happen in real time. Most services offer a presence information feature, indicating whether people on one's list of contacts are currently online and available to chat. This may be called a contact list. In early instant messaging programs, each letter appeared as it was typed, and when letters were deleted to correct typos this was also seen in real time. This made it more like a telephone conversation than exchanging letters. In modern instant messaging programs, the other party in the conversation generally only sees each line of text right after a new line is started. Most instant messaging applications also include the ability to set a status message, roughly analogous to the message on a telephone answering machine.

Popular instant messaging services on the public Internet include .NET Messenger Service, MSN Messenger, AOL Instant Messenger, Excite/Pal, Gadu-Gadu, Google Talk, iChat, ICQ, Jabber, Qnext, QQ, Meetro, Skype, Trillian and Yahoo! Messenger. These services owe many ideas to an older (and still popular) online chat medium known as Internet Relay Chat (IRC).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for user notification involves receiving an event notification related to an event associated with user notification by a user; providing the event notification from a stored array to a process executed by a processor; using the event notification as a first title used for the process; providing a second title from the stored array to the process; and using the second title to identify the process to the user. The method may further include processing an event, such as by way of example but not limitation, a new mail event, a new instant message event, a reminder event, a calendar event, or some other event, and generating a string of characters that includes information associated with the event. The method may further include displaying the string of characters as a title associated with the process. A system constructed according to the technique may include a client, a title array, an event processing engine, and a title provisioning engine.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
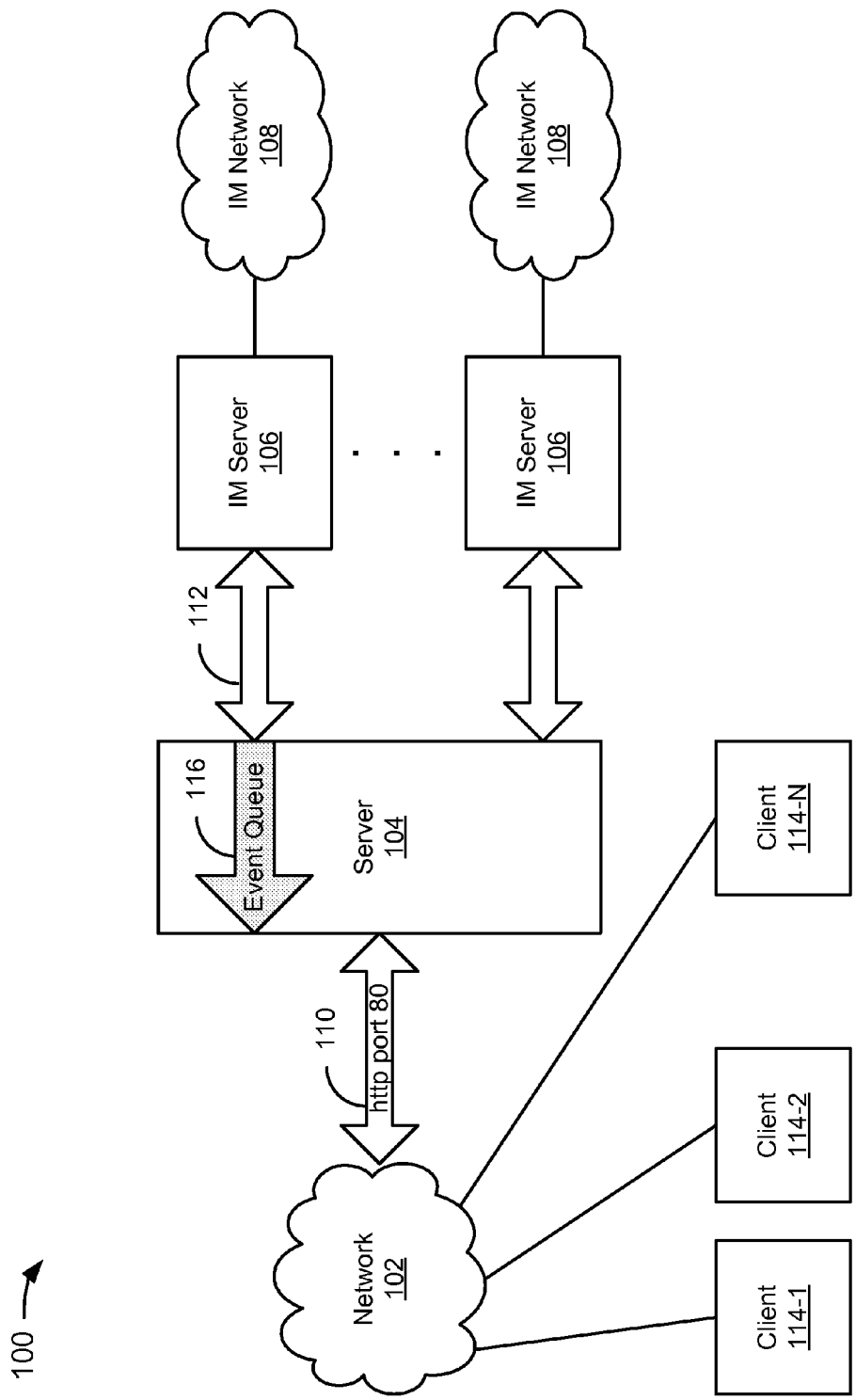
FIG. 1 depicts an example of a system for providing instant messages to clients via a web interface.

FIG. 1 depicts an example of a system 100 for providing instant messages to clients via a web interface. In the example of FIG. 1, the system 100 includes a network 102, a server 104, and an Instant Messenger (IM) server 106, and an IM network 108. The server 104 is coupled to the network at least by way of port 80. The two way communication via port 80 is represented in the example of FIG. 1 as an arrow 110. The server 104 is coupled to the IM server 106 via one or more other ports. The two way communication via the other ports is represented in the example of FIG. 1 as an arrow 112. The IM server 106 is coupled to the IM network 108 via any known or convenient mechanism. Indeed, the IM server 106 may be thought of as part of the IM network 108. The network 102 couples a plurality of clients 114-1 to 114-N (referred to collectively as clients 114) to the server 104. In the example of FIG. 1, the server 104 includes an event queue 116.

The network 102 may include by way of example but not limitation LAN, WAN, VLAN, WLAN, Internet, cellular network, phone network, radio network, or some other known or convenient network. The term "Internet" as used herein refers to a network of networks that uses certain protocols, such as TCP/IP, and possibly other protocols such as the hypertext transfer protocol (HTTP) for hypertext markup language (HTML) documents that make up the World Wide Web (the web). The physical connections of the Internet and the protocols and communication procedures are well known, but any convenient physical connections or protocols could be used.

The server 104 may include a multiple servers. Indeed, it may be desirable, depending upon details of a particular implementation, to install several servers to cope with the number of simultaneous users the system 100 supports. It may further be desirable, depending upon details of a particular implementation, for the server 104 to have a high CPU throughput, together with large amounts of RAM, to handle a large number of users. It may further be desirable, depending upon details of a particular implementation, to accomplish resource sharing via thread handling where a pool of threads is shared and used by one or more of the clients 114 for client-server communication and between the server 104 and the IM server 106.

The server 104 may include one or more of an application server, database server, web server, banners server, and content server, or any combination thereof. To make the most of the techniques described herein, the server 104 should, though is not required to, include at least one application server. The other servers can have supporting roles in, by way of example but not limitation, serving static content or advertising (e.g., banners), storing usage data, or fulfilling some other known or convenient function.

The server 104 may act as a proxy server between the clients 114 and the IM server 106. The server 104 receives communications from the clients 114 on http port 80, and responds to the clients 114 on http port 80. Communications from the clients 114 that are bound for the IM network 108, however, must also come through http port 80 to the server 104, and are then forwarded to the IM server 106. In this way, the server 104 acts as a carrier of the data from users to the IM network 108 using a mechanism that controls and manages the data (e.g., text messages, display images, emoticons, audio/video streams, etc.) sent between one of the clients 114 and the server 104, and vice versa.

The IM server 106 may be any known or convenient IM server that is compatible with IM. Events, messages, or other appropriate data from the IM server 106 are collected in the event queue 116 of the server 104. The events may be collected in association with a variety of protocols including by way of example but not limitation port 1863, port 5050, port 5222, port 5190, etc.

The IM network 108 may include one or a combination of networks selected from MSN Messenger, Yahoo! Messenger, AIM AOL, ICQ, QQ, Jabber, Google Talk, IRC, or some other known or convenient IM network.

The clients 114 may include any known or convenient device, including by way of example but not limitation, a Web browser, mobile client, PDA, game console, TV box, native application, etc. The clients poll the server 104 for events. The events can be removed from the event queue 116 and translated into text, JavaScript, XML, or some other known or convenient format that one or more of the clients 114 need or expect in order to process data associated with the event.

To interact with the IM network 108, the clients 114 send data to the server 104. The data, which may include commands, is processed and translated into corresponding data that will be sent to the appropriate IM network. In an embodiment, the appropriate IM network may be determinable based upon the protocol encoded in a message.

Messages or actions from the clients 114 are collected over network protocols such as, by way of example but not limitation, HTTP or plain socket connections. The messages or actions are transformed to an appropriate protocol format to be sent over a compliant port from the clients 114 to the server 104, with the IM protocol on the application side. In a non-limiting embodiment, the compliant port is http port 80. However, any port having similar characteristics to those of a typical port 80 could be used.

The latest available browsers, as of December 2005, enable the use of a technique called AJAX (Asynchronous JavaScript And XML). With AJAX, appropriately configured clients 114 can execute actions and poll for messages or events using only JavaScript. The method is based on using an XMLHttpRequest object to make HTTP requests to the server 104. The server 104 may reply with messages taken from the queue of the corresponding session in XML (or another) format that are parsed and displayed according to the message content.

For clients 114 that include a browser, when accessing the server 104 the browser typically uses hidden HTML frames to update information on visible frames. The visible frames display appropriate information while the hidden frames are reloaded in short periods of time. In each refresh that hits the server 104, the browser identifies the current messaging session and checks if new events or messages associated with the session are in the event queue 116. When new information arrives and needs to be displayed in some form, the browser makes use of, for example, JavaScript code to update the visible frames and windows with new messages or events keeping the information up to date in the screen. In this way, automatic refreshing can take place in a hidden frame.

In another embodiment, certain of the clients 114 with browsers may not make use of refreshes. For example, a form of updating the screen without using a refresh technique is to keep one single HTTP socket request alive for the whole period of a messaging session without actually closing the socket connection. In this example, information is initially loaded and displayed in one single visible frame. While events and messages are being received by the server 104, JavaScript code can be injected into the HTML document through the same HTTP socket kept alive and managed by the server 104. For each event or message, the browser can interpret the JavaScript code injected and the corresponding parts of the HTML document and windows will be updated.

In another embodiment, certain of the clients 114 with browsers may make use of manual refreshes. Some relatively unsophisticated browsers, such as WAP and xHTML browsers often available on mobile phones, do not support hidden frames and/or JavaScript (and others may be configured such that they do not support hidden frames and/or JavaScript). In such cases, the information displayed has to be updated manually by the user. Manual updating enables any mobile phone, PDA, TV Set or any device with a browser to connect to the server 104 and use the messaging platforms made available by the server 104 assuring the communication between the clients 114 and the IM server 106.

Message history can be stored by most IM clients on a local computer. For alternative web and mobile-based clients local storage may not be possible. In a non-limiting embodiment, the server 104, may have the capability to store message history from IM conversations done via one or more of the clients 114. The message history can be accessed and searched at any time via the server 104 by one or more of the clients 114

Figure 2:
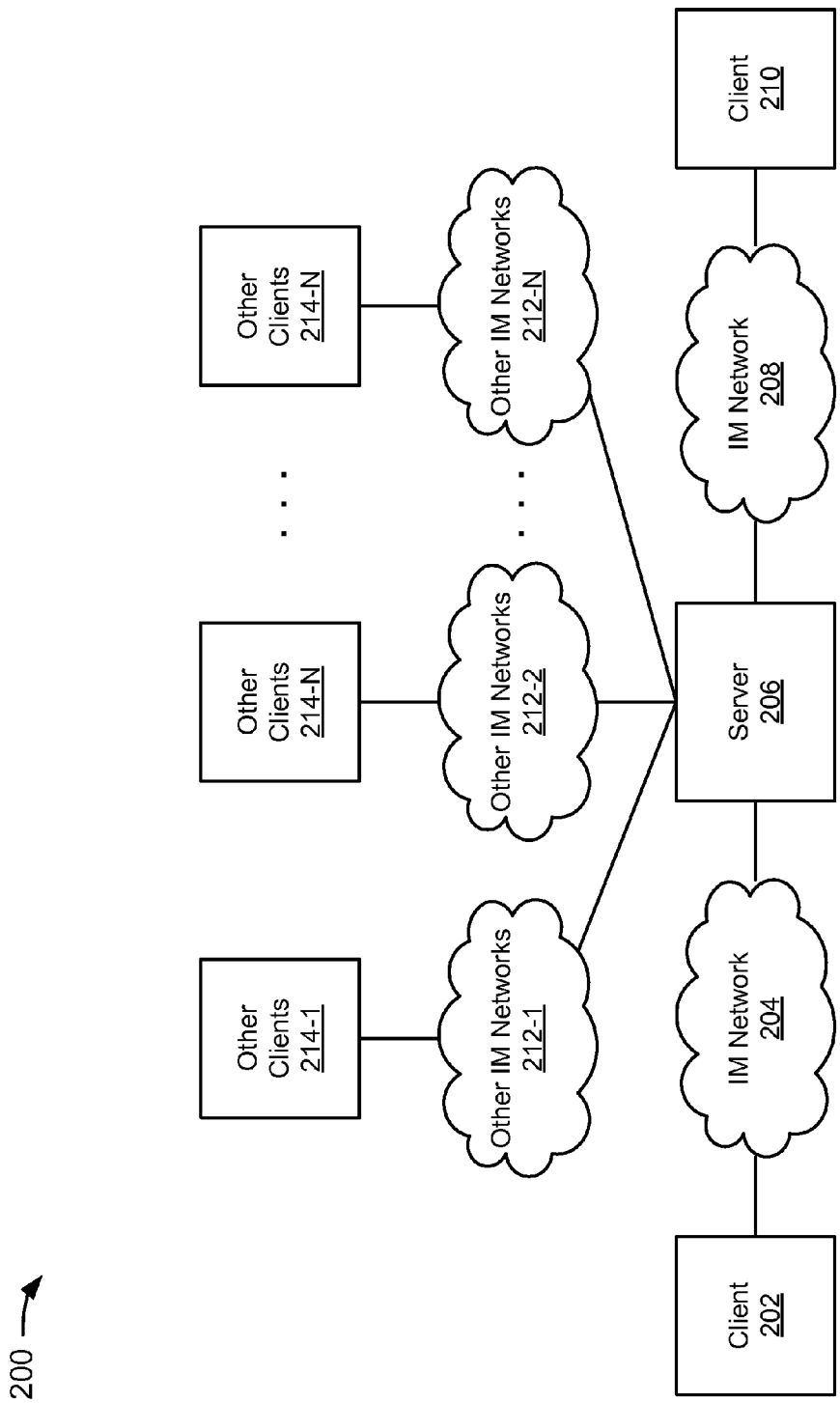
FIG. 2 depicts an example of a system for displaying content from an IM client at an alternative IM client.

FIG. 2 depicts an example of a system 200 for displaying content from an IM client at an alternative IM client. In the example of FIG. 2, the system 200 includes a client 202, an IM network 204, a server 206, an IM network 208, a client 210, other IM networks 212-1 to 212-N (referred to collectively as other IM networks 212), and other clients 214-1 to 214-N (referred to collectively as other clients 214).

For illustrative purposes, it is assumed that the client 202 has content that is compatible with the IM network 204. However, the client 210 is capable of reading content formatted to be compatible with the IM network 208. Thus, in operation, the server 206 collects content from the client 202 (either through the IM network 204, as shown in FIG. 2, or directly from the client 202, such as is shown by way of example in FIG. 1). The server 206 then formats the content as appropriate for use on the IM network 208. Once the content is properly formatted, it can be made available to the client 210 (either through the IM network 208, as shown in FIG. 2, or directly to the client 210, such as is shown by way of example in FIG. 1). Depending upon the embodiment and/or implementation, the content may also be formatted as appropriate for one or more of the other IM networks 212, to be made available for one or more of the other clients 214.

As is well-understood, different devices provide different functionality. For example, a desktop typically provides greater storage, greater display area, and greater power than a cell phone. Thus, at best, an IM client must work under the constraints imposed by a particular device. Depending upon the device, certain functionality may be more useful. For example, a device may have inferior capabilities with respect to notifying a user when a message is received.

The device capabilities may limit the way in which a user can be notified when a message is received. The environment in which a user operates may provide another limitation. For example, a user at work may not want to play a noise or have a popup window show up every time a message is received. Similarly, a user who gets lots of messages may not want to hear the noise or see the popup windows because of the great frequency with which it occurs. Advantageously, notification can take place in a titlebar, which is great for devices that have inferior notification functionality, and great for users who want a subtle notification.

Figure 3A:
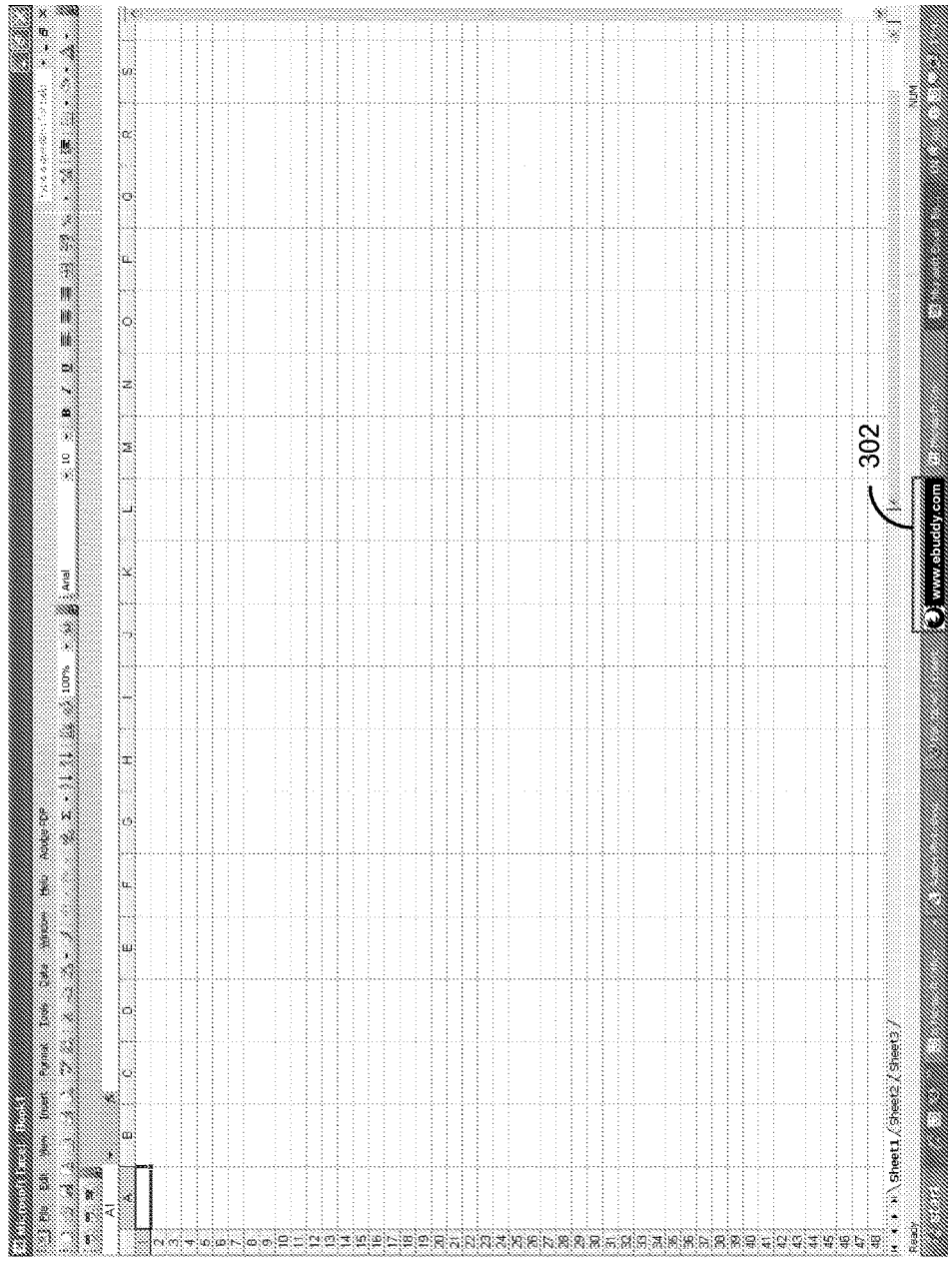
FIGS. 3A-3D depict examples of screenshots with IM notification functionality.

FIGS. 3A-3D depict examples of screenshots 300 with IM notification functionality. The bar may be a titlebar, a taskbar, or some other menu or display item. In the example of FIG. 3A, the taskbar includes a process identified by the taskbar item 302. For illustrative purposes, the process is a Firefox® web browser that is at the site www.ebuddy.com. The screenshot appears as a conventional screen might look. However, when a new message arrives, the taskbar changes.

Figure 3B:
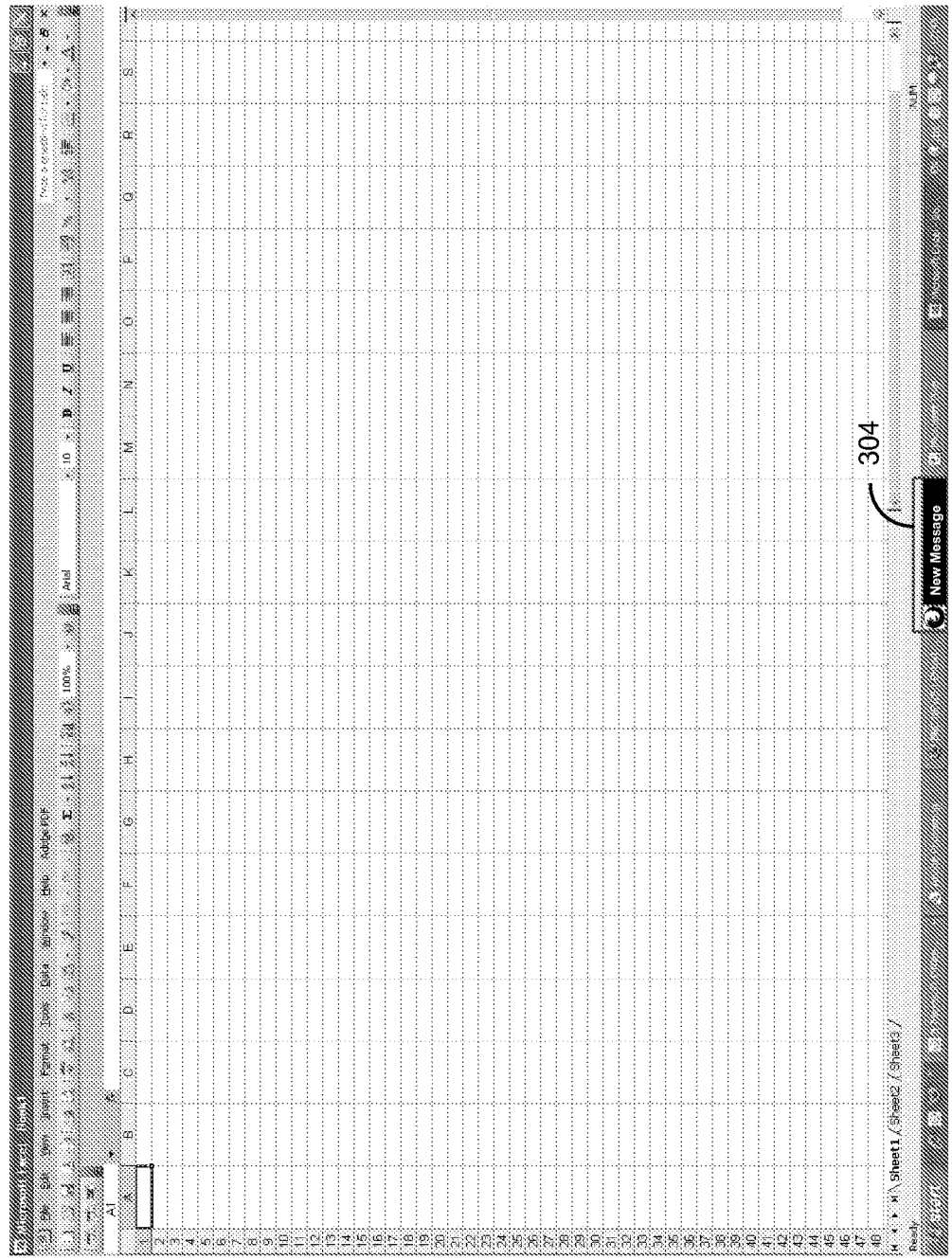

In the example of FIG. 3B, the taskbar includes the Firefox® web browser process, but the taskbar item 304 appears differently. Specifically, rather than depicting the site www.ebuddy.com, the taskbar item 304 now indicates that a new message is available. The IM notification functionality may be cool on a desktop, but can be particularly useful in other implementations.

For example, notifying a user when new messages arrive or events happen gracefully can be done by a native IM application. However, for alternative web clients this is more difficult given the nature of control from within a browser to the Operating System. There is less control for alerts like flashing windows etc. from browsers. In such cases, it may be particularly advantageous for a server to be able to provide a user with alerts for new messages or events using the title bar, task bar, or other display area of a browser.

Figure 3C:
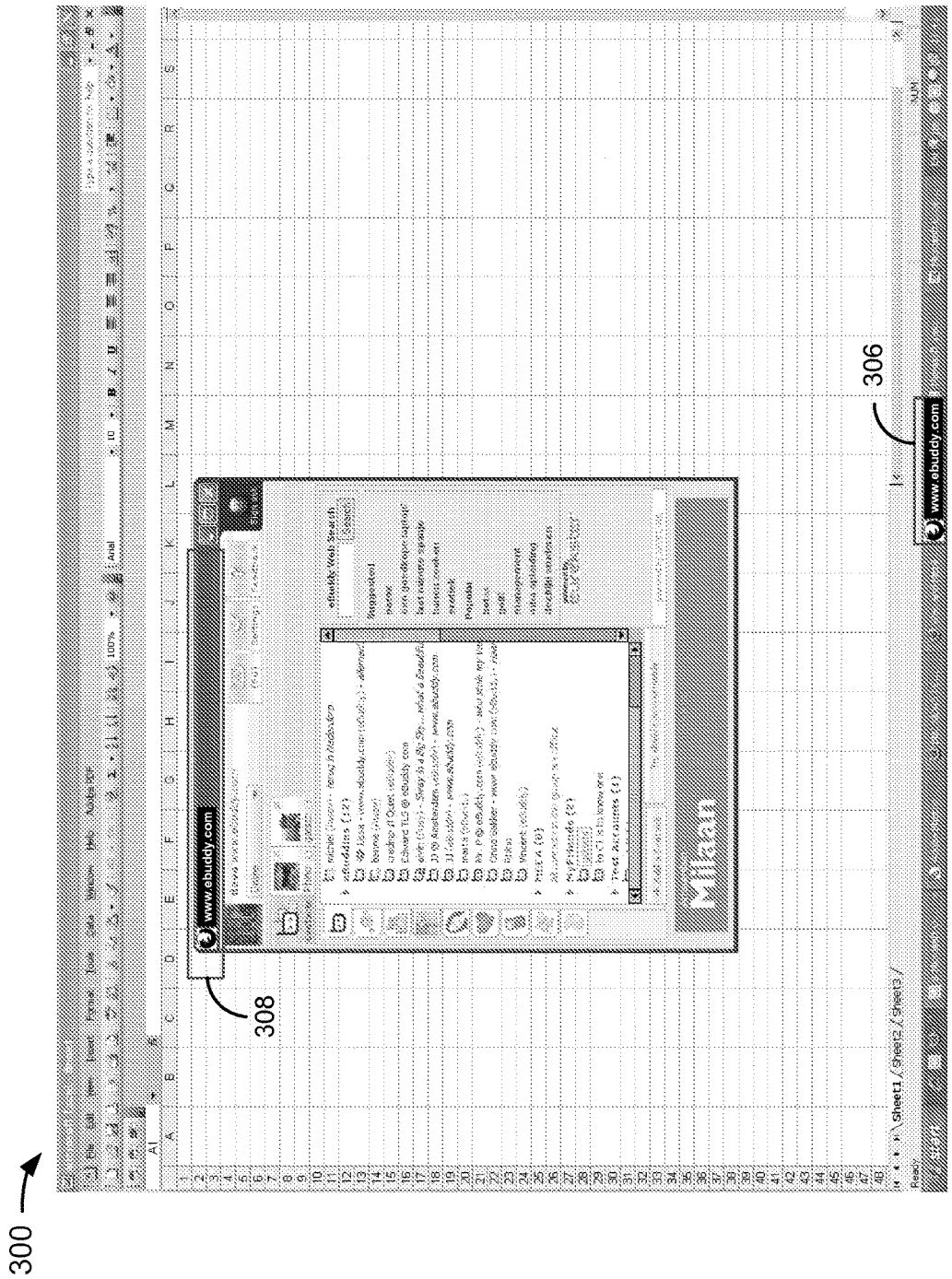

In the example of FIG. 3C, the Firefox® browser is open, and the taskbar item 306 indicates the current site is www.ebuddy.com. The titlebar 308 includes similar information. If a new message is received, then both the titlebar and the taskbar can be changed.

Figure 3D:
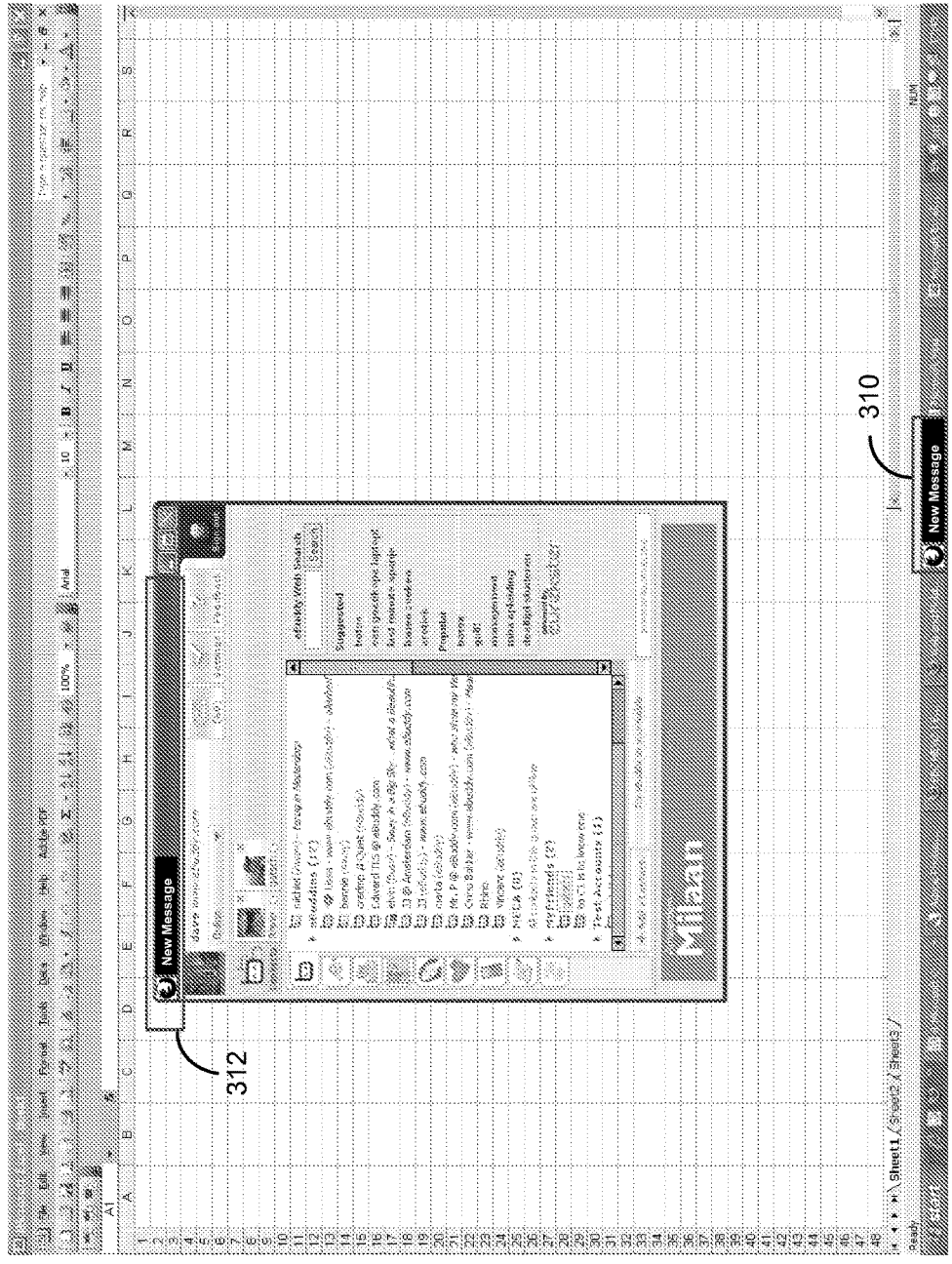

In the example of FIG. 3D, the taskbar includes the Firefox® web browser with a changed taskbar item 310. The titlebar 312 is also changed to indicate a new message has been received. The exact information in a titlebar, taskbar, or other display area is implementation specific. Thus, the titlebar 312 is simply illustrative. When an event, message, or other data is available to the client, the titlebar 312 may change to show information about the event. If properly configured, the taskbar item 310 and the titlebar 312 could even display different information (though in a typical implementation the text is identical, albeit often necessarily shortened on the taskbar).

The title can be used to notify users of certain events by changing the title of the IM client. The changing of the text in the taskbar and/or titlebar may stand out from other taskbars and/or with fixed texts.

Figure 4:
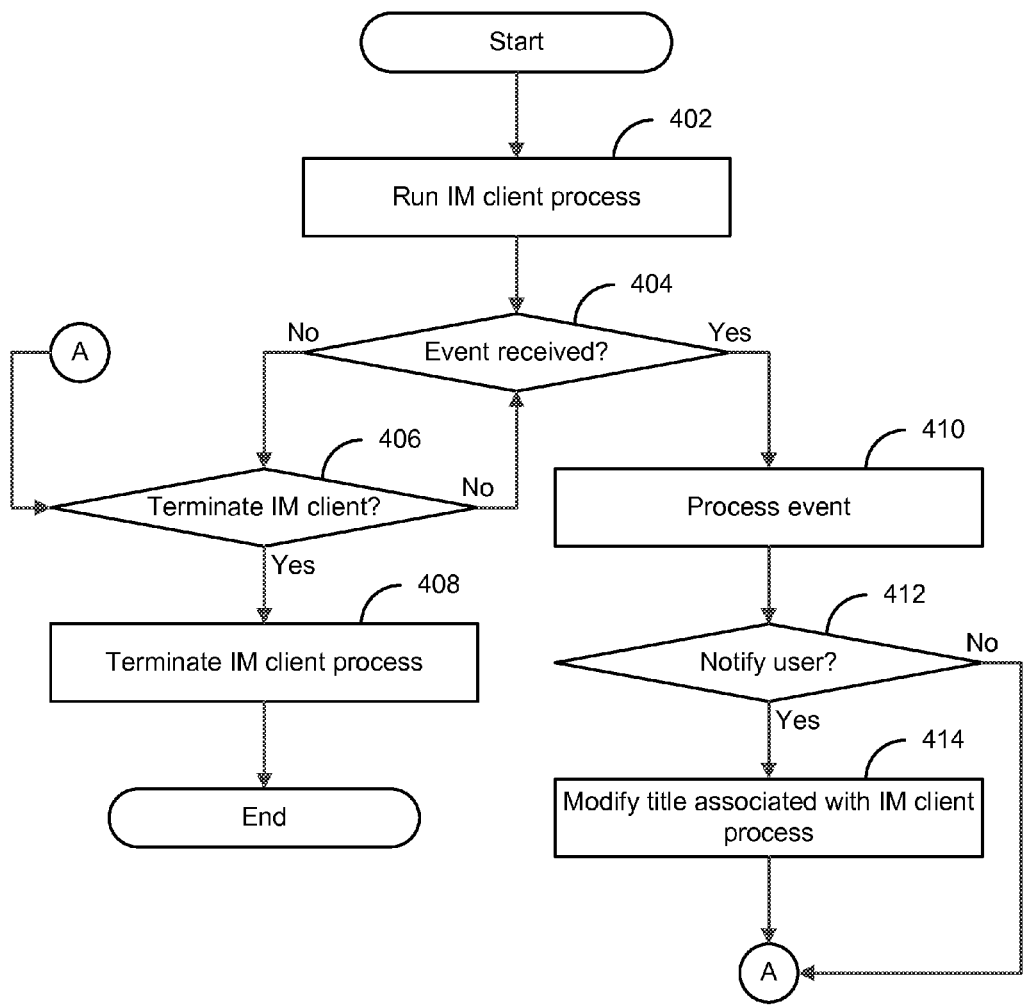
FIG. 4 depicts a flowchart of an example of a method for changing a title associated with a titlebar.

FIG. 4 depicts a flowchart 400 of an example of a method for changing a title associated with a titlebar (and an associated taskbar item, if applicable). In the example of FIG. 4, the flowchart 400 starts at module 402 where an IM client process is running. The IM client process may include, by way of example but not limitation, a browser.

In the example of FIG. 4, the flowchart 400 continues to decision point 404 where it is determined whether an event has been received. If it is determined that an event has not been received (404-N), then the flowchart 400 continues to decision point 406 where it is determined whether to terminate the IM client process. If it is determined that the IM client process is to be terminated (406-Y), then the flowchart 400 continues to module 408 where the IM client process is terminated, and the flowchart 400 ends. If, on the other hand, it is determined that the IM client process is not to be terminated (406-N) then the flowchart 400 loops back to decision point 404, as described above.

In the example of FIG. 4, eventually, assuming the IM client process is not terminated (408), it is determined that an event has been received (404-Y), and the flowchart 400 continues to module 410 where the event is processed. Events are processed in a known or convenient manner.

In the example of FIG. 4, the flowchart 400 continues to decision point 412 where it is determined whether notification is called for. Events may or may not result in notification of a user, depending upon the event, embodiment, implementation, device limitations, and/or user's IM client configuration. If it is determined that user notification is called for (412-Y), then the flowchart 400 continues to module 414 where a title associated with the IM client process is modified. If, on the other hand, it is determined that user notification is not called for (412-N), or in any case after module 414, the flowchart 400 loops back to decision point 406, as described above.

Modifying the title (414) presumably modifies the display in the applicable titlebar and/or the display in the applicable taskbar item. Conventional browsers typically do not allow setting a title in a titlebar that is different from the corresponding taskbar item. However, a display area could display information different from that of the title, if configured appropriately. Moreover, future browsers may include functionality that allows displaying different titles in the titlebar and the taskbar.

Figure 5:
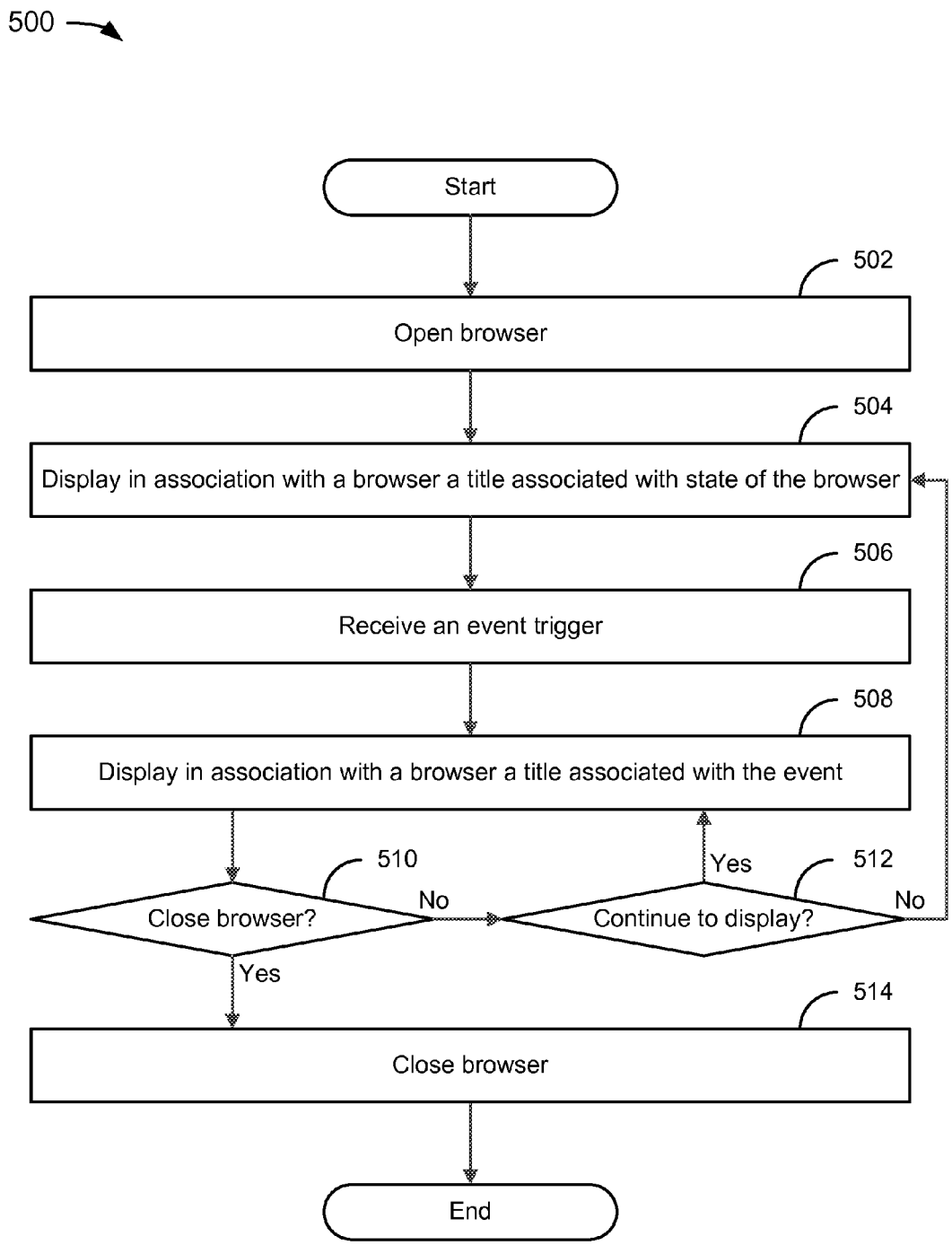
FIG. 5 depicts a flowchart of an example of a method for displaying an event-related title.

The title of the application may or may not keep the changed value until the user takes some action (e.g., clicking on the taskbar item associated with the IM client process). For example, the original title could be displayed after a certain amount of time has passed (e.g., a "new message" title could last for 10 seconds before reverting to the original title). FIG. 5 depicts a flowchart 500 of an example of a method for displaying an event-related title. In the example of FIG. 5, the flowchart 500 starts at module 502 where a browser is opened.

In the example of FIG. 5, the flowchart 500 continues to module 504 a title associated with state of a browser is displayed in association with the browser. The state of the browser may include, for example, a current site for which the browser is displaying a page, as is shown in FIGS. 3A and 3C. In general, the title associated with state of the browser includes any title that would normally be displayed in association therewith prior to updating the title in response to an event notification.

In the example of FIG. 5, the flowchart 500 continues to module 506 where an event trigger is received. The event trigger is associated with an event that calls for notifying a user. For example, the event trigger may include receipt of a new instant message.

In the example of FIG. 5, the flowchart 500 continues to module 508 where a title associated with the event is displayed in association with the browser. Thus, the title associated with the state of the browser is replaced by the title associated with the event. Moreover, in a non-limiting embodiment, the state of the browser is unchanged (other than the title, of course).

In the example of FIG. 5, the flowchart 500 continues to decision point 510 where it is determined whether to close the browser. If the browser is not to be closed (510-N), then the flowchart 500 continues to decision point 512 where it is determined whether to continue to display the title associated with the event. If so (512-Y), then the flowchart 500 loops back to module 508, as described previously. If not (512-N), then the flowchart 500 loops back to module 504, as described previously. The determination as to whether to continue to display the title associated with the event may be based upon, by way of example but not limitation, a notification timer, an event-specific timer, a user action, or some other action that is sufficient to indicate that the title associated with the event should not longer be displayed. If, on the other hand, the browser is to be closed (510-Y), then the flowchart 500 continues to module 514 where the browser is closed, and the flowchart 500 ends.

The title of, e.g., a window shows up in both the titlebar of a window and in the taskbar. Advantageously, users can be notified of events in the taskbar, while they are using another application. The changing taskbar would benefit clients on devices using a desktop system that allows multiple applications to run at the same time, e.g. Mail client, Browser, IM, etc. While users are switching between various applications and an IM client they may not be aware of new messages/events that have arrived. The alternating messages can be seen in a taskbar even if, for example, the browser window is minimized or behind other application or browser windows (as in FIGS. 3A, 3B).

Figure 6:
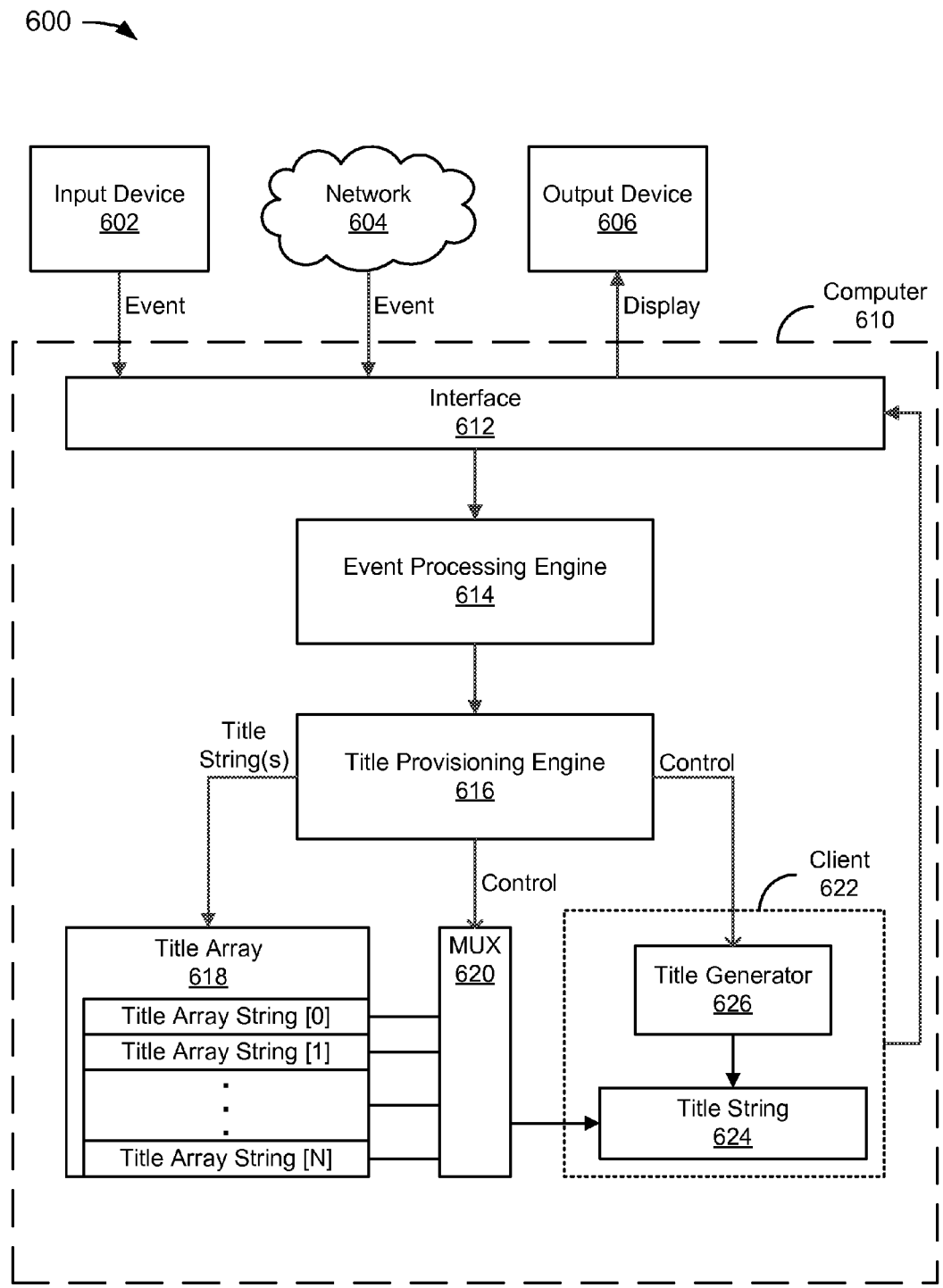
FIG. 6 depicts an example of a system for programmed text event-specific title provisioning.

Advantageously, in an embodiment, a title associated with an event can include programmed text effects. FIG. 6 depicts an example of a system 600 for programmed text event-specific title provisioning. The system 600 includes an input device 602, a network 604, an output device 606, and a computer 610. The input device 602 may be any known or convenient device that is capable of generating or forwarding events to the computer 610. In a typical implementation, events will be received at the computer 610 via the network 604. Most computers include output devices for on which a variety of output is displayed.

The computer 610 includes an interface 612, an event processing engine 614, a title provisioning engine 616, a title array 618, a multiplexer 620, and a client 622. The interface 612 may include an implementation-specific number of different kinds of known or convenient interfaces. The input device 602, the network 604, and the output device 606 are coupled to the computer 610 using the interface 612.

An event received on the interface 612 (from either the input device 602 or the network 604) is provided to the event processing engine 614 for processing in a known or convenient manner. The event processing engine 614 may be embodied in a computer-readable medium. If user notification is desired for the event, the user can be notified in any known or convenient manner.

Advantageously, data associated with the event can also (or in the alternative) be provided to the title provisioning engine 616. The title provisioning engine 616 may be embodied in a computer-readable medium. In the example of FIG. 6, the title provisioning engine 616 inputs title strings, which are strings of characters, to the title array 618. The title array 618 includes N−1 title array strings, embodied in a computer-readable medium, which are referenced (for illustrative purposes) as title array string [0] to title array string [N].

A given event may cause the title provisioning engine 616 to rewrite the entire title array 618 with title strings associated with the most recent events. Alternatively, a given event may cause the title provisioning engine 616 to append title strings to the end of the title array 618. In a non-limiting embodiment, the title provisioning engine 616 updates the current title array 618 by adding new data associated with an event, excluding redundant data (e.g., data that is already represented in the title array 618).

In the example of FIG. 6, the multiplexer 620 selects one of the title array strings for provisioning to the client 622. The multiplexer 620 receives a control signal from the title provisioning engine 616 to accomplish this task. The multiplexer 620 is a conceptual construct that is intended to illustrate selecting one of the title array strings using an index to the title array 618. Thus, the multiplexer 620 may or may not be embodied in a computer-readable medium. It should be noted that the multiplexer 620, in at least one embodiment, is not a hardware MUX, though it could conceivably be implemented as such.

In the example of FIG. 6, the client 622 includes a title string 624 and a title generator 626. The client 622 may include, by way of example but not limitation, an IM client, an email client, a VoIP client, or some other communications-related client. The client 622 may include a window, panel, or some other display that includes a title. The title generator 626 generates a title for the display in a known or convenient manner.

However, in a non-limiting embodiment, the title provisioning engine 616 controls the title generator 626 to either generate a title in the usual way (e.g., using the state of the client 622 to determine an appropriate title), or to not generate a title because a title string is available from the title array 618. Thus, title string 624, which is embodied in a computer-readable medium in association with the display, will include either a title generated in accordance with the state of the client 622 or a title string from the title array 618 (specifically, the title array string selected by the multiplexer 620). The display (e.g., a window including the title string 624) is provided to the interface 612 for display on the output device 606.

Advantageously, although the title string 624 is likely to have display limitations associated with the client 622, the operating system, the output device 606, or other factors, creative control of the title array 618 can yield interesting title display characteristics. For example, the title can appear to have scrolling text, blinking, alternating upper and lower case, etc.

Scrolling text may be accomplished by cycling through the title array 618 over time. After the title array string [N] is displayed, the title array 618 can start over at title array string [0], or allow the title generator 626 to generate a title instead. The scrolling text could include the actual message of an IM message, displayed in the title over time, the scrolling text could scroll through a list of senders of email that has not yet been checked. Blinking can be accomplished by, conceptually, making every other title array string blank. Alternatively, a NULL string could be periodically provided instead of a title array string. The number of programmed text effects available to those of ordinary skill in the art of computer programming, with this teaching before them, are practically impossible to list exhaustively so no effort is made to do so herein.

Figure 7:
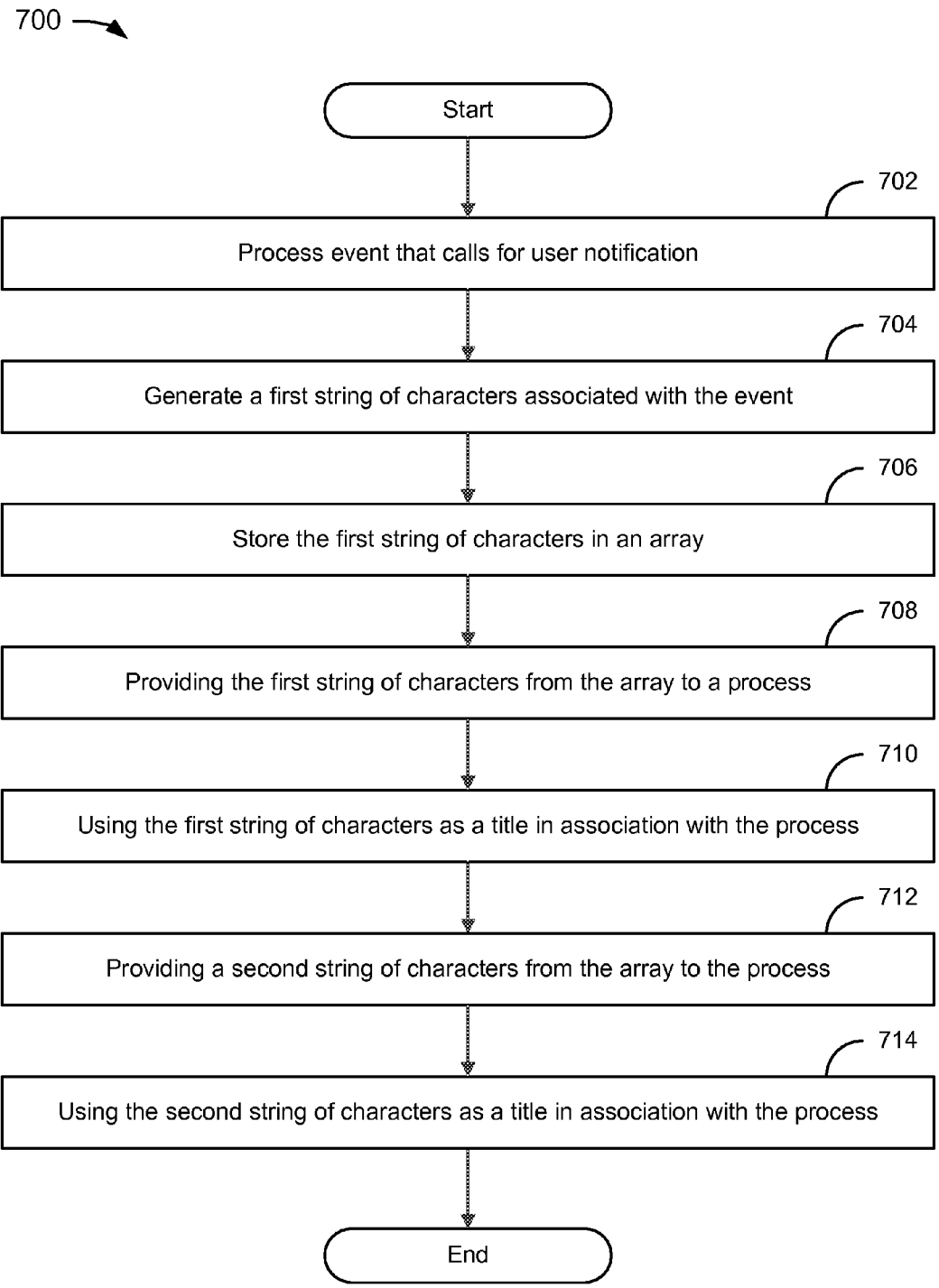
FIG. 7 depicts a flowchart of an example of a method for displaying programmed text titles.

FIG. 7 depicts a flowchart 700 of an example of a method for displaying programmed text titles. In the example of FIG. 7, the flowchart 700 starts at module 702 where an event that calls for user notification is processed. It may be noted that whether the event calls for user notification may or may not be known until after the event is processed.

In the example of FIG. 7, the flowchart 700 continues to module 704 where a first string of characters associated with the event is generated. There may or may not be a second, third, etc. string of characters associated with the event generated, as well.

In the example of FIG. 7, the flowchart 700 continues to module 706 where the first string of characters is stored in an array. The array may include other strings of characters associated with other events, or the first string of characters (and second, third, etc. string of characters) associated with the event may replace all current characters strings of the array.

In the example of FIG. 7, the flowchart 700 continues to module 708 where the first string of characters is provided from the array to a process. The process may include, by way of example but not limitation, an IM client operating in a Windows® environment.

In the example of FIG. 7, the flowchart 700 continues to module 710 where the first string of characters is used as a title in association with the process. For example, if the process is an IM client operating in a Windows® environment, the first string of characters could be used such that the window associated with the IM client includes the first string of characters (or at least the first subset of the first string of characters, if the window is too small to display the entire string) in the titlebar. Similarly, in this specific example, the first string of characters could be displayed in a taskbar item associated with the IM client.

In the example of FIG. 7, the flowchart 700 continues to module 712 where a second string of characters is provided from the array to the process. The second string of characters could be associated with the same event as the first string of characters, an earlier event (where the second string remains in the array), or a later event (where the second string replaces or is in addition to strings associated with the last processed event). The second string of characters could also be unassociated with an event. For example, the second string of characters could be a NULL string that has the effect of causing the first string of characters (if provided before and after the second string of characters) to blink or flash.

In the example of FIG. 7, the flowchart 700 continues to module 714 where the second string of characters is used as a title in association with the process. Then the flowchart 700 ends. It should be noted that the flowchart 700 simply illustrates a first and second string of characters from the array being used as a title, and then ends. Of course, the flowchart could continue with modules (not shown) where the first string of characters is repeated as a title, another event is processed, a third string of characters is provided, or with some other applicable module or sequence of modules.

Figure 8:
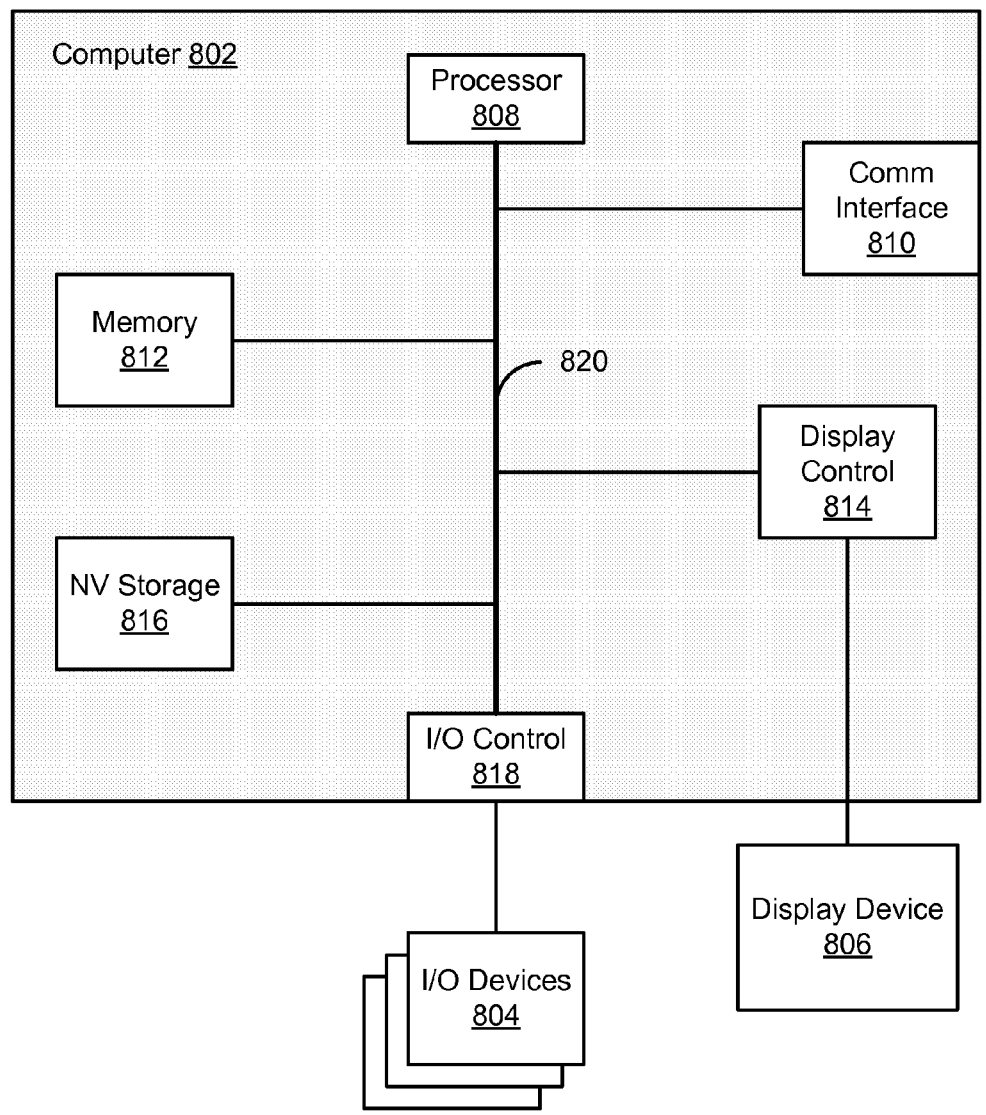
FIG. 8 depicts a computer system suitable for implementation of the techniques described above with reference to FIGS. 1-7.

FIG. 8 depicts a computer system 800 suitable for implementation of the techniques described above with reference to FIGS. 1-7. The computer system 800 includes a computer 802, I/O devices 804, and a display device 806. The computer 802 includes a processor 808, a communications interface 810, memory 812, display controller 814, non-volatile storage 816, and I/O controller 818. The computer 802 may be coupled to or include the I/O devices 804 and display device 806.

The computer 802 interfaces to external systems through the communications interface 810, which may include a modem or network interface. The communications interface 810 can be considered to be part of the computer system 800 or a part of the computer 802. The communications interface 810 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 810 optional in the strictest sense of the word.

The processor 808 may include, by way of example but not limitation, a conventional microprocessor such as an Intel Pentium microprocessor or Motorola power PC microprocessor. While the processor 808 is a critical component of all conventional computers, any applicable known or convenient processor could be used for the purposes of implementing the techniques described herein. The memory 812 is coupled to the processor 808 by a bus 820. The memory 812, which may be referred to as "primary memory," can include Dynamic Random Access Memory (DRAM) and can also include Static RAM (SRAM). The bus 820 couples the processor 808 to the memory 812, and also to the non-volatile storage 816, to the display controller 814, and to the I/O controller 818.

The I/O devices 804 can include a keyboard, disk drives, printers, a scanner, and other input and output devices, including a mouse or other pointing device. For illustrative purposes, at least one of the I/O devices is assumed to be a block-based media device, such as a DVD player. The display controller 814 may control, in a known or convenient manner, a display on the display device 806, which can be, for example, a cathode ray tube (CRT) or liquid crystal display (LCD).

The display controller 814 and I/O controller 818 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 816, which may be referred to as "secondary memory," is often a magnetic hard disk, an optical disk, or another form of storage for large amounts of data. Some of this data is often written, by a direct memory access process, into memory 812 during execution of software in the computer 802. The non-volatile storage 816 may include a block-based media device. The terms "machine-readable medium" or "computer-readable medium" include any known or convenient storage device that is accessible by the processor 808 and also encompasses a carrier wave that encodes a data signal.

The computer system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

The computer system 800 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method comprising:
    obtaining from a title provisioning engine a first title string associated with one or more webpages accessed through a browser;
    displaying the first title string at a predetermined position of a screen associated with the browser;
    receiving a first event trigger associated with a first event in a web-based instant messaging (IM) process performed through one of the one or more webpages accessed through the browser;
    selecting a second title string, associated with the first event in the web-based IM process, from a title array;

determining, based on the first event in the web-based IM process and the second title string, whether to perform:
replacing, following the first event trigger, the first title string with the second title string in the title array, or
appending, following the first event trigger, the second title string to the end of the title array;
replacing, following the first event trigger and in response to the determination, the first title string with the second title string in the title array;
receiving a second event trigger associated with a second event in the web-based IM process;
displaying, following the second event trigger, a third title string associated with the one or more webpages accessed through the browser.

2. The method of claim 1, wherein displaying the third title string associated with the one or more webpages accessed through the browser includes replacing the second title string with the third title string.

3. The method of claim 1, wherein replacing the first title string with the second title string occurs in a taskbar such that a user can be notified of the first event in the taskbar.

4. The method of claim 1, wherein displaying the third title string associated with the one or more webpages accessed through the browser includes reverting from the second title string to the first title string and, at a later time, replacing the first title string with the third title string.

5. The method of claim 4, wherein reverting to the first title string is controlled by a notification timer, an event-specific timer, or a user action.

6. The method of claim 1, wherein the first event trigger and the second event trigger are associated with first and second events that call for notifying a user in association with the web-based IM process.

7. The method of claim 1, wherein replacing the first title string with the second title string leaves a state of the browser unchanged other than a state related to display of the second title string in lieu of the first title string.

8. The method of claim 1, wherein the third title string is enqueued on the title array, the method further comprising selecting the third title string from the title array.

9. The method of claim 1, wherein the second title string includes scrolling text, blinking, or alternating upper and lower case text.

10. A system comprising:
means for obtaining from a title provisioning engine a first title string associated with one or more webpages accessed through a browser;
means for displaying the first title string at a predetermined position of a screen associated with the browser;
means for receiving a first event trigger associated with a first event in a web-based instant messaging (IM) process performed through one of the one or more webpages accessed through the browser;
means for selecting a second title string, associated with the first event in the web-based IM process, from a title array;
means for determining, based on the first event in the web-based IM process and the second title string, whether to perform:
replacing, following the first event trigger, the first title string with the second title string in the title array, or
appending, following the first event trigger, the second title string to the end of the title array;
means for replacing, following the first event trigger, the first title string with the second title string in the title array;
means for receiving a second event trigger associated with a second event in the web-based IM process;
means for displaying, following the second event trigger, a third title string associated with the one or more webpages accessed through the browser.

11. The system of claim 10, wherein displaying the third title string associated with the one or more webpages accessed through the browser includes replacing the second title string with the third title string.

12. The system of claim 10, wherein replacing the first title string with the second title string occurs in a taskbar such that a user can be notified of the first event in the taskbar.

13. The system of claim 10, wherein displaying the third title string associated with the one or more webpages accessed through the browser includes reverting from the second title string to the first title string and, at a later time, replacing the first title string with the third title string.

14. The system of claim 13, wherein reverting to the first title string is controlled by a notification timer, an event-specific timer, or a user action.

15. The system of claim 10, wherein the first event trigger and the second event trigger are associated with first and second events that call for notifying a user in association with the web-based IM process.

16. The system of claim 10, wherein replacing the first title string with the second title string leaves a state of the browser unchanged other than state related to display of the second title string in lieu of the first title string.

17. The system of claim 10, wherein the third title string is enqueued on the title array, the system further comprising means for selecting the third title string from the title array.

18. The system of claim 10, wherein the second title string includes scrolling text, blinking, or alternating upper and lower case text.

19. A system comprising:
a title provisioning engine configured to provide a first title string associated with one or more webpages accessed through a browser;
an output device configured to display the first title string at a predetermined position of a screen associated with the browser;
an event processing engine configured to receive a first event trigger associated with a first event in a web-based instant messaging (IM) process performed through one of the one or more webpages accessed through the browser;
wherein, in operation:
the title provisioning engine selects a second title string, associated with the first event in the web-based IM process, from a title array;
the title provisioning engine determines, based on the first event in the web-based IM process and the second title string, whether to perform:
replacing, following the first event trigger, the first title string with the second title string in the title array, or
appending, following the first event trigger, the second title string to the end of the title array;
the title provisioning engine replaces, following the first event trigger, the first title string with the second title string in the title array;
the event processing engine receives a second event trigger associated with a second event in the web-based IM process;

the output device displays, following the second event trigger, a third title string associated with the one or more webpages accessed through the browser.

20. The method of claim 1, comprising generating, at a title generator, the first title string.

21. The method of claim 1, comprising generating, at a title generator, the third title string.

22. The method of claim 1, comprising controlling the title array to display the second title string with title display characteristics selected from a group of title display characteristics consisting of scrolling text, blinking, and alternating upper and lower case text.

23. The method of claim 22, wherein the title display characteristics consist of scrolling text, comprising cycling through the title array over time to display the first title string after displaying the third title string.

24. The method of claim 22, wherein the title display characteristics consist of scrolling text, comprising:
   generating at a title generator the third title string;
   displaying the first title string after displaying the third title string.

25. The method of claim 22, wherein the title display characteristics consist of scrolling text and wherein the second title string includes an actual message displayed over time via scrolling text.

26. The method of claim 22, wherein the title display characteristics consist of scrolling text and wherein the second title string and third title string include first and second senders of unread messages.

27. The method of claim 22, wherein the title display characteristics consist of blinking and wherein the third title string is a NULL string, comprising periodically alternatively displaying the second title string and the third title string.

28. The method of claim 22, wherein the title display characteristics consist of blinking and wherein the third title string is a NULL string, comprising periodically alternatively displaying the third title string and the first title string.

29. The method of claim 22, wherein the title display characteristics consist of blinking and wherein the third title string is a NULL string, comprising periodically alternatively displaying the third title string and a fourth title string.

30. The method of claim 1, wherein the first title string and the third title string are the same title string, and wherein displaying the third title string includes replacing the second title string with the third title string.

31. The system of claim 10, comprising means for generating the first title string.

32. The system of claim 10, comprising means for generating the third title string.

33. The system of claim 10, comprising means for controlling the title array to display the second title string with title display characteristics selected from a group of title display characteristics consisting of scrolling text, blinking, and alternating upper and lower case text.

34. The system of claim 33, wherein the title display characteristics consist of scrolling text, comprising cycling through the title array over time to display the first title string after displaying the third title string.

35. The system of claim 33, wherein the title display characteristics consist of scrolling text, comprising:
   means for generating the third title string;
   means for displaying the first title string after displaying the third title string.

36. The system of claim 33, wherein the title display characteristics consist of scrolling text and wherein the second title string includes an actual message displayed over time via scrolling text.

37. The system of claim 33, wherein the title display characteristics consist of scrolling text and wherein the second title string and third title string include first and second senders of unread messages.

38. The system of claim 33, wherein the title display characteristics consist of blinking and wherein the third title string is a NULL string, comprising periodically alternatively displaying the second title string and the third title string.

39. The system of claim 33, wherein the title display characteristics consist of blinking and wherein the third title string is a NULL string, comprising periodically alternatively displaying the third title string and the first title string.

40. The system of claim 33, wherein the title display characteristics consist of blinking and wherein the third title string is a NULL string, comprising periodically alternatively displaying the third title string and a fourth title string.

41. The system of claim 10, wherein the first title string and the third title string are the same title string, and wherein displaying the third title string includes replacing the second title string with the third title string.

* * * * *